(12) United States Patent
Katsumata

(10) Patent No.: US 11,165,934 B2
(45) Date of Patent: Nov. 2, 2021

(54) IMAGE CAPTURING APPARATUS CAPABLE OF PHOTOGRAPHING MOVING IMAGE AND METHOD OF CONTROLLING SAME

(71) Applicant: CANON KABUSHIKI KAISHA, Tokyo (JP)

(72) Inventor: Momoe Katsumata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/080,070

(22) Filed: Oct. 26, 2020

(65) Prior Publication Data

US 2021/0127041 A1 Apr. 29, 2021

(30) Foreign Application Priority Data

Oct. 29, 2019 (JP) .............................. JP2019-196444

(51) Int. Cl.
*H04N 5/225* (2006.01)
*G03B 17/56* (2021.01)
*G03B 17/02* (2021.01)

(52) U.S. Cl.
CPC ........... *H04N 5/2252* (2013.01); *G03B 17/02* (2013.01); *G03B 17/563* (2013.01); *H04N 5/2254* (2013.01); *H04N 5/2257* (2013.01)

(58) Field of Classification Search
CPC ..... G03B 17/563; G03B 17/02; H04N 5/2252
See application file for complete search history.

(56) References Cited

U.S. PATENT DOCUMENTS 7,359,003 B1 * 4/2008 Knighton ......... H04N 5/225251
348/376
2020/0336649 A1 * 10/2020 Nagano .............. H04N 5/23209

FOREIGN PATENT DOCUMENTS

JP 2011234291 A 11/2011

\* cited by examiner

*Primary Examiner* — Christopher K Peterson
(74) *Attorney, Agent, or Firm* — Rossi, Kimms & McDowell LLP

(57) ABSTRACT

An image capturing apparatus that increases time over which a moving image can be photographed by reducing the influence of heat generated in the apparatus. An image processing circuit performs predetermined processing on a moving image captured by an image capturing device. A plurality of recording media are arranged inside a grip portion for gripping an apparatus body. An internal casing ensures strength of the apparatus, and a system control circuit controls the apparatus. When moving image data formed by the image processing circuit using the captured moving image in a plurality of recording modes are recorded in the plurality of recording media, the system control circuit causes image data having a large volume to be recorded in a recording medium close to the internal casing and image data having a small volume to be recorded in a recording medium far from the internal casing.

12 Claims, 7 Drawing Sheets

IMAGE CAPTURING APPARATUS CAPABLE OF PHOTOGRAPHING MOVING IMAGE AND METHOD OF CONTROLLING SAME

BACKGROUND OF THE INVENTION

Field of the Invention

The present invention relates to an image capturing apparatus that is capable of photographing a moving image and a method of controlling the same, and more particularly to an image capturing apparatus configured to simultaneously record a moving image in a plurality of recording media and a method of controlling the same.

Description of the Related Art

In recent years, along with an increase in the power consumption of an image capturing apparatus, the temperature of an exterior thereof or the temperature of electrical components thereof tends to rise, and as a result, a time period over which a moving image can be photographed tends to be reduced. Although components of the image capturing apparatus, which mainly generate heat, are an image capturing device and an image processing engine, the amount of heat generated by a recording medium also increases along with an increase in power consumption, caused by an increase in the communication speed of the recording medium.

To cope with this, with a view to extending the time over which a moving image can be photographed as much as possible, there have been devised various methods, including a method of diffusing heat generated from electrical components, within the image capturing apparatus, so as to prevent a local temperature rise.

On the other hand, some image capturing apparatuses are capable of having a plurality of recording media mounted therein, and there have been proposed various methods of using a plurality of recording media in combination. An image capturing apparatus of this type is capable of not only recording the same image data formed by a single photographing operation in a plurality of recording media, but also recording image data in a plurality of recording media in different formats selected by a user, respectively. Further, Japanese Laid-Open Patent Publication (Kokai) No. 2011-234291 discloses a technique for detecting which of a plurality of recording medium mounting sections has a recording medium mounted therein and determining a recording mode according to a detection result.

However, Japanese Laid-Open Patent Publication (Kokai) No. 2011-234291has no description or suggestion about a positional relationship between the plurality of recording media, an exterior of the image capturing apparatus, an internal casing, electrical components, etc. Therefore, there is a fear that a local temperature rise occurs within the image capturing apparatus depending on a set recording mode, causing reduction of the time period over which a moving image can be photographed.

SUMMARY OF THE INVENTION

The present invention provides an image capturing apparatus that increases a time period over which a moving image can be photographed, by reducing the influence of heat generated in the image capturing apparatus, and a method of controlling the image capturing apparatus.

In a first aspect of the present invention, there is provided an image capturing apparatus comprising an image capturing unit, an image processing unit configured to perform predetermined processing on a moving image captured by the image capturing unit, a grip portion for gripping an image capturing apparatus body, a plurality of recording media arranged inside the grip portion, a chassis provided inside the image capturing apparatus for ensuring strength of the image capturing apparatus, and a control unit configured to control the image capturing apparatus, wherein when causing moving image data, which are formed in a plurality of recording modes by the image processing unit using the moving image, to be recorded in the plurality of recording media, the control unit causes image data having a large volume to be recorded in a recording medium close to the chassis and causes image data having a small volume to be recorded in a recording medium far from the chassis.

In a second aspect of the present invention, there is provided a method of controlling an image capturing apparatus including an image capturing unit, an image processing unit configured to perform predetermined processing on a moving image captured by the image capturing unit, a grip portion for gripping an image capturing apparatus body, a plurality of recording media arranged inside the grip portion, and a chassis provided inside the image capturing apparatus for ensuring strength of the image capturing apparatus, the method comprising causing, when causing moving image data, which are formed in a plurality of recording modes by the image processing unit using the moving image, to be recorded in the plurality of recording media, image data having a large volume to be recorded in a recording medium close to the chassis and image data having a small volume to be recorded in a recording medium far from the chassis.

According to the present invention, image data having a large volume is recorded in a recording medium which is close to the chassis and image data having a small volume is recorded in a recording medium which is far from the chassis. This makes it possible to disperse a large amount of heat generated in the recording medium in which the image data having a large volume is recorded, in the entire image capturing apparatus, and hence it is possible to increase a time period over which a moving image can be photographed.

Further features of the present invention will become apparent from the following description of exemplary embodiments (with reference to the attached drawings).

DESCRIPTION OF THE EMBODIMENTS

Figure 1A:
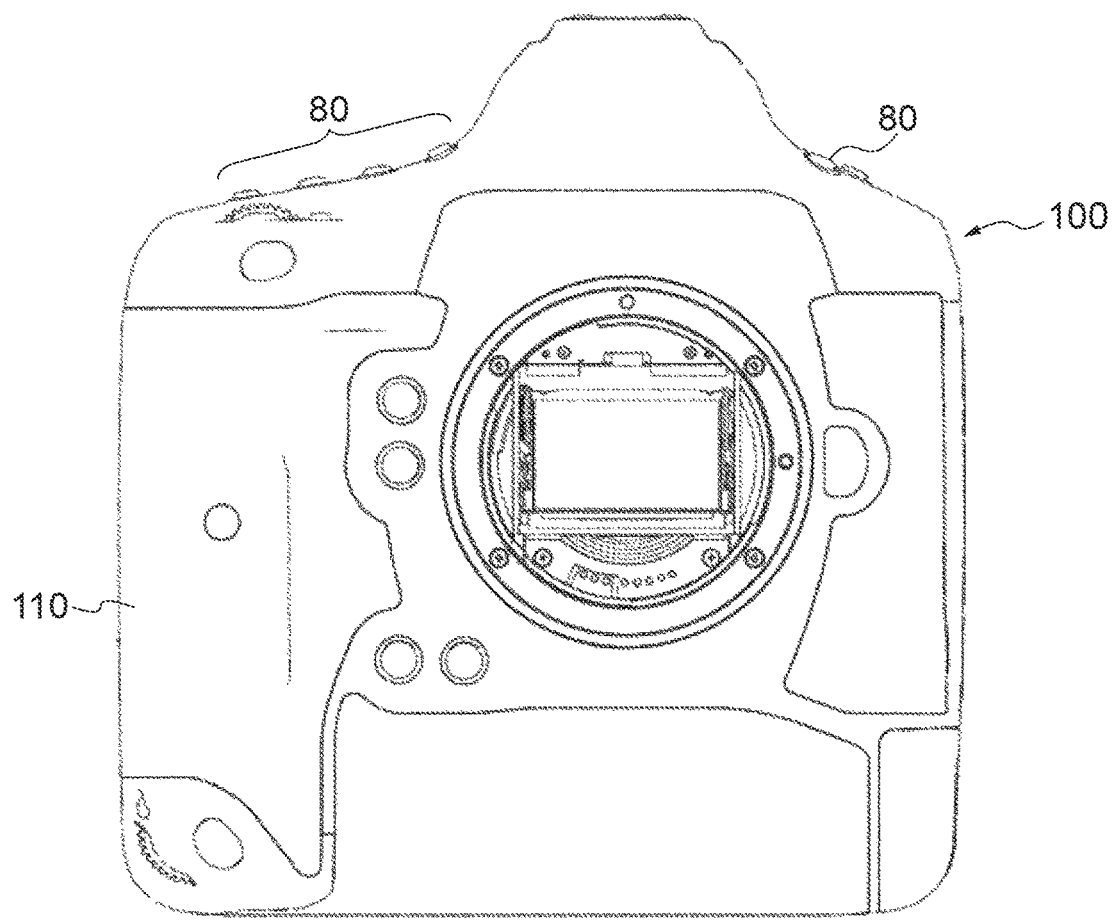
FIGS. 1A and 1B are views showing a digital camera as an image capturing apparatus according to a first embodiment.
Figure 1B:
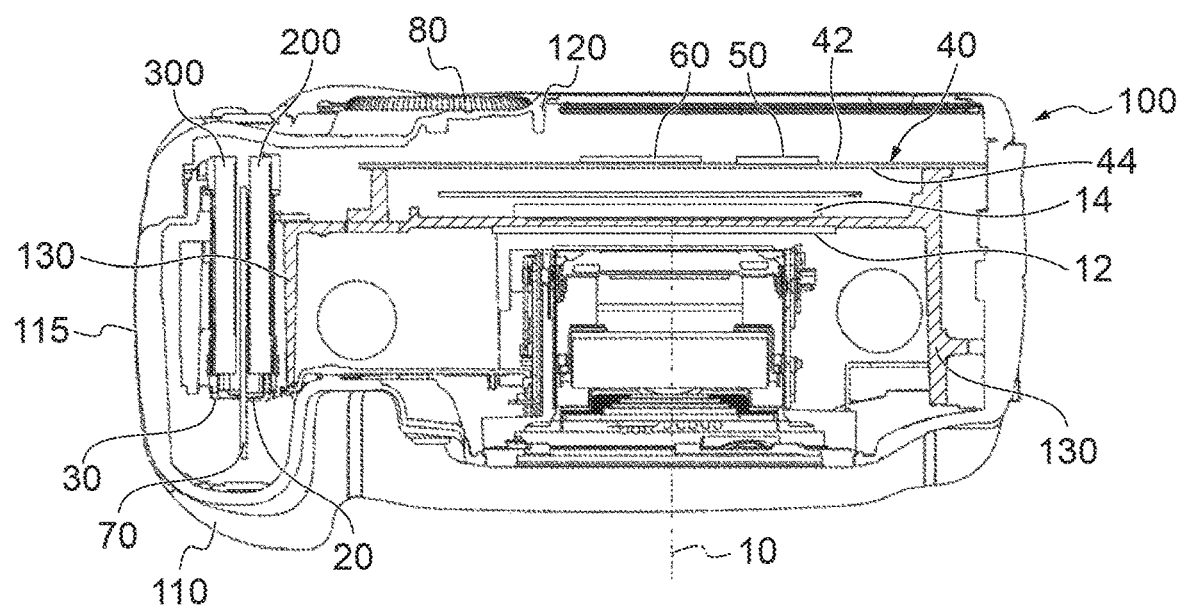

The present invention will now be described in detail below with reference to the accompanying drawings showing embodiments thereof FIGS. 1A and 1B are views showing an image capturing apparatus according to a first embodiment of the invention. FIG. 1A is a front view of a digital camera 100 as the image capturing apparatus, and FIG. 1B is a central cross-sectional view of the digital camera 100, taken along a horizontal direction.

The digital camera 100 is provided with a grip portion 110 used for gripping a body of the digital camera 100 (image capturing apparatus body), a grip portion cover 115 which is brought into contact with a user's palm when the user grips the grip portion 110, and an operation section 80.

A card slot circuit board 70 is arranged inside the grip portion 110. The card slot circuit board 70 is arranged in parallel with a photographing optical axis 10 indicated by a one-dot chain line. A first card slot 20 and a second card slot 30 are provided on a front side and a reverse side of the card slot circuit board 70, respectively.

That is, the first card slot 20 and the second card slot 30 are arranged in parallel with the photographing optical axis 10 inside the grip portion 110. The first card slot 20 is arranged closer to the photographing optical axis 10 than the second card slot 30 is, and the second card slot 30 is arranged closer to the grip portion cover 115 than the first card slot 20 is. A recording medium 200 is mounted in the first card slot 20, and a recording medium 300 is mounted in the second card slot 30.

Further, the digital camera 100 is provided with a rear cover 120 and an internal casing 130. The rear cover 120 is a member for protecting a rear side of the digital camera 100. The internal casing 130 is a chassis partially or entirely formed of metal and is a member for ensuring the mechanical strength of the image capturing apparatus body. The internal casing 130 also serves as a member on which various component members of the digital camera 100, including the card slot circuit board 70, are mounted. Heat transferred to the internal casing 130 is diffused throughout the entire digital camera 100.

The first card slot 20 is closer to the internal casing 130 than the exterior, and hence heat generated in the recording medium 200 mounted in the first card slot 20 is easily transferred to the internal casing 130. On the other hand, the second card slot 30 is arranged toward the exterior, and hence heat generated in the recording medium 300 mounted in the second card slot 30 is easily transferred to the grip portion cover 115.

A main circuit board 40 and an image capturing device 14 are arranged such that they are orthogonal to the photographing optical axis 10 extending substantially in the center of the digital camera 100, in other words, such that they are parallel with the rear cover 120. Further, an image capturing shutter 12 is arranged in parallel with the image capturing device 14. An image processing circuit 60 and a system control circuit 50 are mounted on a first surface 42, which faces the rear cover 120, of the main circuit board 40.

In the digital camera 100 constructed as described above, the internal casing 130 is partially or entirely formed of metal as mentioned above, and heat transferred to the internal casing 130 is substantially uniformly diffused throughout the entire digital camera 100 (entire image capturing apparatus). On the other hand, in a case where the exterior components including the grip portion cover 115 are formed of metal, heat generated in the digital camera 100 is diffused to the outside via the exterior components.

Therefore, to efficiently disperse heat generated in the recording medium 200 and the recording medium 300 and thereby increase the time period over which a moving image can be photographed, it is effective to reduce the amount of heat transferred to the grip portion cover 115 to a minimum and increase the amount of heat transferred to the internal casing 130. Further, this avoids a high-temperature state of the grip portion 110, which would be otherwise temporarily caused, and prevents a user from feeling uncomfortable.

For this reason, in the present embodiment, it is preferable to cause image data having a large volume and causing generation of a large amount of heat to be recorded in the recording medium 200 close to the internal casing 130, and cause image data having a small volume and causing generation of a small amount of heat to be recorded in the recording medium 300 close to the grip portion cover 115.

Next, the internal configuration of the image capturing apparatus (digital camera) shown in FIGS. 1A and 1B will be described.

Figure 2:
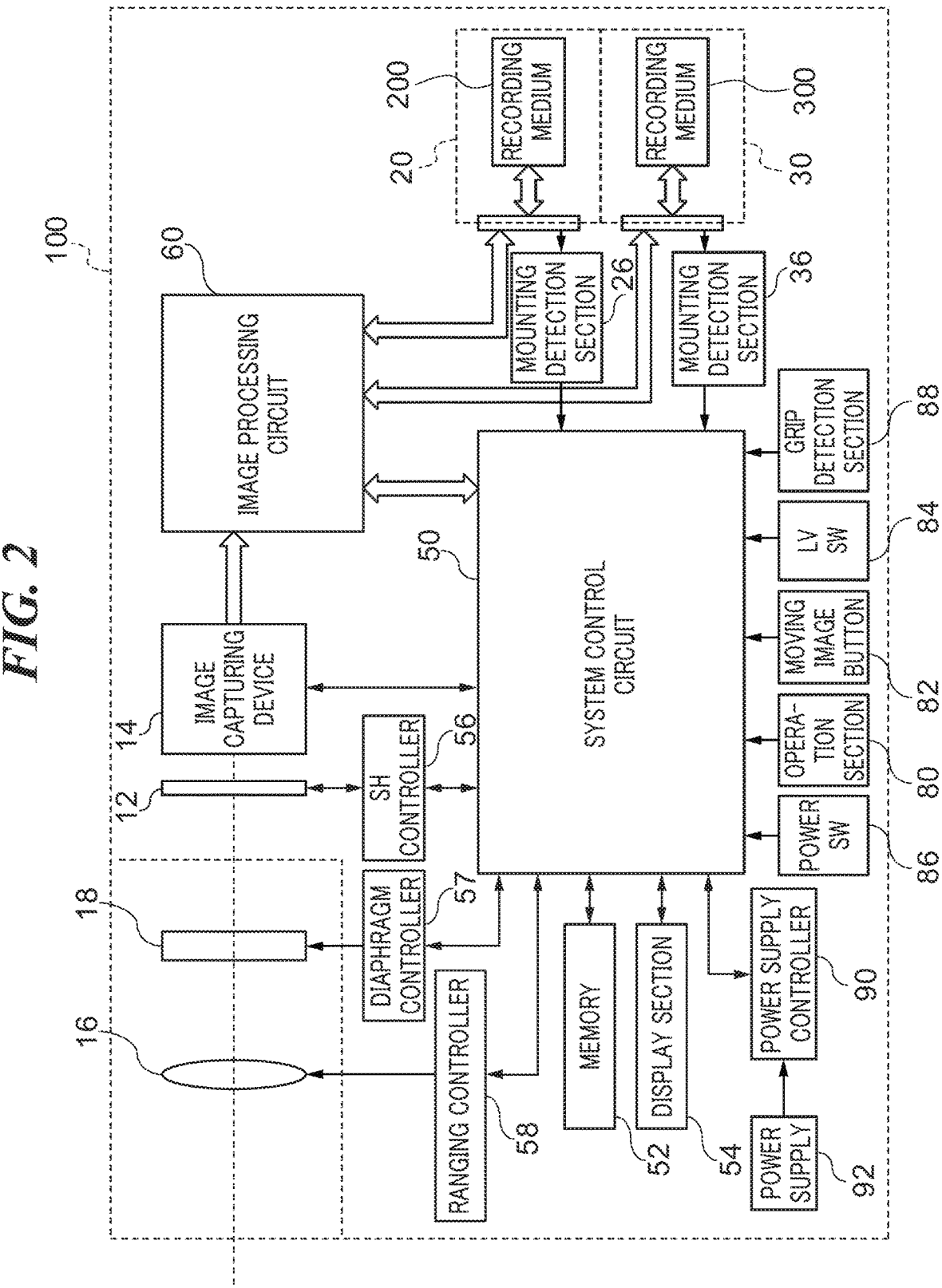
FIG. 2 is a block diagram showing the internal configuration of the digital camera shown in FIGS. 1A and 1B.

FIG. 2 is a block diagram showing the internal configuration of the image capturing apparatus (digital camera) shown in FIGS. 1A and 1B. Referring to FIG. 2, the digital camera 100 includes the system control circuit 50 and the image processing circuit 60.

The system control circuit 50 is connected to a photographic lens 16 via a ranging controller 58 and is connected to a diaphragm 18 via a diaphragm controller 57. Further, the system control circuit 50 is connected to the image capturing shutter 12 via a shutter (SH) controller 56 and is connected to a power supply 92 via a power supply controller 90. Further, the system control circuit 50 is connected to the image capturing device 14, a memory 52, a display section 54, a power switch (SW) 86, the operation section 80, a moving image button 82, a live view switch (LVSW) 84, a grip detection section 88, and mounting detection sections 26 and 36.

The image processing circuit 60 is connected to the image capturing device 14, the system control circuit 50, the first card slot 20, and the second card slot 30, via an address bus and a data bus. The recording medium 200 is mounted in the first card slot 20, and the recording medium 300 is mounted in the second card slot 30. The first card slot 20 is connected to the system control circuit 50 via the mounting detection section 26, and the second card slot 30 is connected to the system control circuit 50 via the mounting detection section 36. The recording medium 200 and the recording medium 300 are of the same type.

The image capturing shutter 12 is a light shielding member, and an amount of exposure to the image capturing device 14 is controlled by opening and closing the image capturing shutter 12. The image capturing device 14 converts an optical image to electrical signals. A light flux entering the photographic lens 16 is guided to the image capturing device 14 through the diaphragm 18 and the image capturing shutter 12 and forms an optical image on an imaging surface of the image capturing device 14.

The first card slot 20 is a card slot for the recording medium 200, and when the recording medium 200 is mounted in the first card slot 20, mounting of the recording medium 200 is detected by the mounting detection section 26. The second card slot 30 is a card slot for the recording medium 300, and when the recording medium 300 is mounted in the second card slot 30, mounting of the recording medium 300 is detected by the mounting detection section 36.

Each of the recording media 200 and 300 is implemented e.g. by a memory card. These recording media each include a recording area formed e.g. by a semiconductor memory, an interface with the digital camera 100, and a connector for connection to the digital camera 100. As the volume of image data to be recorded is larger, the recording media 200 and 300 are driven for a longer time period, consume more power, and generate a larger amount of heat.

The system control circuit 50 is for controlling the overall operation of the digital camera 100, and the memory 52 is for storing constants, variables, programs, etc. for the operation of the system control circuit 50.

The system control circuit 50 is used as determining means and control means in various operations of the digital camera 100. Further, the system control circuit 50 performs AF processing and AE processing by controlling the image capturing shutter 12, the photographic lens 16, and the diaphragm 18, based on results of computation performed by the image processing circuit 60 on image data captured by the image capturing device 14.

The display section 54 is for displaying an operating state and a warning message by using characters, an image, and a voice, in accordance with execution of a program by the system control circuit 50, and displays a live view image and a photographed image. The display section 54 is implemented e.g. by a liquid crystal display and is equipped with a function of delivering sound, such as an operation sound and an alarm, i.e. the function of a speaker.

The image processing circuit 60 performs pixel interpolation, color conversion, and predetermined image processing based on moving image recording settings set in advance (such as the settings of moving image quality and a moving image recording format) on image data captured by the image capturing device 14. The image processing circuit 60 generates one type of moving image data (image data) from one moving image in a case where a one-slot recording mode is set, and generates two types of moving image data (image data) from one moving image in a case where a two-slot recording mode is set. Further, the image processing circuit 60 reads out image data recorded in the recording media 200 and 300, and performs processing for displaying an image on the display section 54.

The operation section 80 is comprised of various buttons, switches, and so forth, and is used for selecting and setting various functions when performing photographing and reproduction, and giving instructions concerning photographing and reproduction. Further, the operation section 80 functions as setting means for setting a recording mode. Further, the operation section 80 is also used for making the moving image recording settings, such as the settings of the moving image recording quality and the moving image recording format, and sets of the moving image recording settings are set for the first card slot 20 and the second card slot 30, respectively.

The moving image button 82 is for starting image capturing of a moving image. When the moving image button 82 is turned on, the system control circuit 50 controls the image capturing device 14 to start image capturing. Upon receipt of an instruction from the system control circuit 50, the image processing circuit 60 performs predetermined image processing on the captured image data and records the processed image data in at least one of respective recording areas of the recording media 200 and 300.

When the live view switch 84 is turned on, the system control circuit 50 controls the image capturing device 14 to start image capturing, and the image processing circuit 60 performs image processing for live view on the captured image data. When the live view switch 84 is turned on, the system control circuit 50 displays the live view by sequentially displaying image data on the display section 54. When the live view switch 84 is turned off, the system control circuit 50 stops the live view display.

The power switch 86 is for switching on/off of the power supply of the digital camera 100. The grip detection section 88 is detecting means for detecting whether or not the grip portion 110, described hereinafter, is being gripped, and is implemented by a sensor for detecting a change in electrostatic capacitance, a tactile sensor, or the like.

The moving image recording mode of the digital camera 100 includes the one-slot recording mode and the two-slot recording mode. The one-slot recording mode is a mode in which one type of moving image data is generated from photographed image data and is recorded in one recording medium, and the two-slot recording mode is a mode in which two types of moving image data are simultaneously generated from photographed image data and are recorded in two recording media, respectively.

Figure 3:
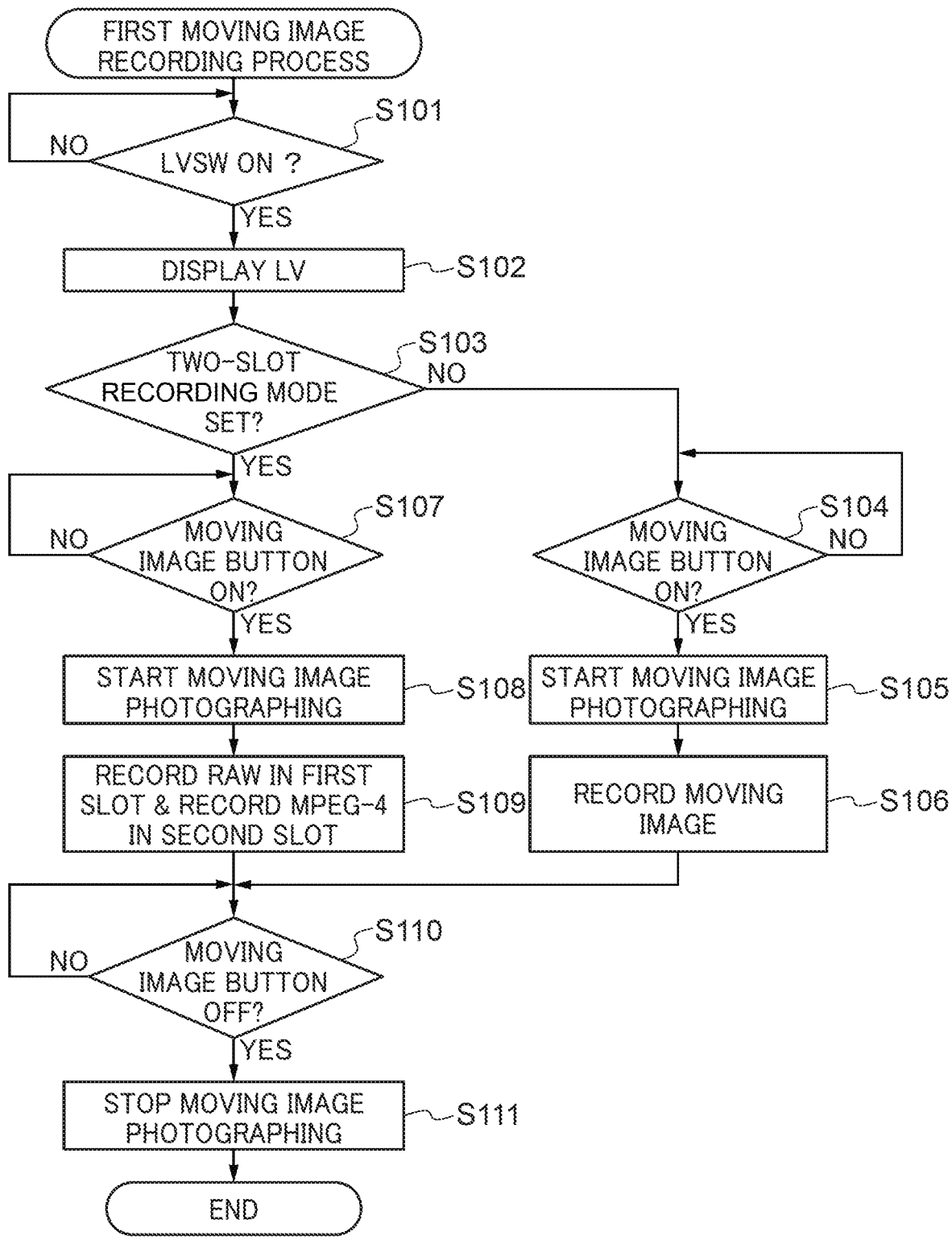
FIG. 3 is a flowchart of a first moving image recording process performed by the digital camera.

FIG. 3 is a flowchart of a first moving image recording process performed by the digital camera 100. The first moving image recording process is executed by a CPU, not shown, incorporated in the system control circuit 50 (in the description of the first moving image recording process, given hereafter, this CPU is simply referred to as the "system control circuit 50") according to a first moving image recording process program stored in a ROM, not shown, either. This moving image recording process includes a moving image recording process performed in a case where a moving image is simultaneously recorded in a plurality of recording media.

Referring to FIG. 3, when the moving image recording process is started, the system control circuit 50 determines whether or not the live view switch (LV SW) 84 has been turned on to start live view (step S101). If it is determined in the step S101 that the live view switch 84 has not been turned on (NO to the step S101), the system control circuit 50 waits until the live view switch 84 is turned on and repeats the determination operation.

If it is determined in the step S101 that the live view switch 84 has been turned on to start live view (YES to the step S101), the system control circuit 50 proceeds to a step S102. More specifically, the system control circuit 50 controls the image capturing device 14 to start image capturing and controls the image processing circuit 60 to perform image processing for live view on captured image data to thereby display the live view (LV) on the display section 54 (step S102).

After displaying the live view on the display section 54 (step S102), the system control circuit 50 determines whether or not the moving image recording mode is set to the two-slot recording mode (step S103). If it is determined in the step S103 that the moving image recording mode is set to the two-slot recording mode (YES to the step S103), the system control circuit 50 determines whether or not the moving image button 82 has been turned on (step S107). If it is determined in the step S107 that the moving image button 82 has not been turned on (NO to the step S107), the system control circuit 50 waits until the moving image button 82 is turned on.

On the other hand, if it is determined in the step S107 that the moving image button 82 has been turned on (YES to the step S107), the system control circuit 50 proceeds to a step S108. More specifically, the system control circuit 50 starts moving image photographing and controls the image processing circuit 60 to perform image processing according to the settings of two moving image recording set in advance to thereby generate two image data (step S108), and records the generated image data in the recording media, respectively (step S109). At this time, the system control circuit 50 records image data having a large volume in the recording medium 200 mounted in the first card slot 20 close to the internal casing 130 and image data having a small volume in the recording medium 300 mounted in the second card slot 30 far from the internal casing 130. For example, in a case where the moving image recording formats of the moving image recording settings in the two-slot recording mode are the two types of RAW and MPEG-4, RAW data having a large volume is recorded in the recording medium 200, and MPEG-4 data having a small volume is recorded in the recording medium 300. The image data having a large volume, which generates a large amount of heat, is recorded in the recording medium 200 close to the internal casing 130, and the generated heat is rapidly transferred to the internal casing 130 and is dispersed throughout the entire digital camera 100. This makes it possible to reduce the influence of generated heat on the time period over which a moving image can be photographed.

After recording the image data in the recording media (step S109), the system control circuit 50 determines whether or not the moving image button 82 has been turned off (step S110). If it is determined in the step S110 that the moving image button 82 has not been turned off (NO to the step S110), the system control circuit 50 waits until the moving image button 82 is turned off and repeats the determination operation.

If it is determined in the step S110 that the moving image button 82 has been turned off (YES to the step S110), the system control circuit 50 stops the moving image photographing (step S111), followed by terminating this first moving image recording process.

On the other hand, if it is determined in the step S103 that the moving image recording mode is not set to the two-slot recording mode but to the one-slot recording mode (NO to the step S103), the system control circuit 50 proceeds to a step S104. More specifically, the system control circuit 50 determines whether or not the moving image button 82 has been turned on (step S104). If it is determined in the step S104 that the moving image button 82 has not been turned on (NO to the step S104), the system control circuit 50 waits until the moving image button 82 is turned on.

If it is determined in the step S104 that the moving image button 82 has been turned on (YES to the step S104), the system control circuit 50 proceeds to a step S105. More specifically, the system control circuit 50 starts moving image photographing and controls the image processing circuit 60 to perform image processing according to the moving image recording settings set in advance to thereby generate one image data (step S105), and records the image data subjected to the image processing in one of the recording medium 200 and the recording medium 300 (step S106).

At this time, in a case where it has been detected by the mounting detection section 26 or 36 that the recording medium has been mounted in only one of the card slots 20 and 30, the system control circuit 50 records the moving image data in the card slot in which the recording medium has been mounted. After recording the moving image data, the system control circuit 50 proceeds to the step S110 and performs the above-described processing operations.

According to the process in FIG. 3, moving image data having a large volume is recorded in the recording medium 200 which is close to the internal casing 130 that is advantageous for heat diffusion in the digital camera 100, and moving image data having a small volume is recorded in the recording medium 300 which is far from the internal casing 130 and close to the grip portion cover 115. This makes it possible to uniformly diffuse a large amount of heat generated in the recording medium 200 throughout the entire digital camera 100 via the internal casing 130 and reduce the influence of the generated heat. Therefore, it is possible to increase the time period over which a moving image can be photographed and prevent a locally temperature rise of the grip portion cover 115.

Figure 4:
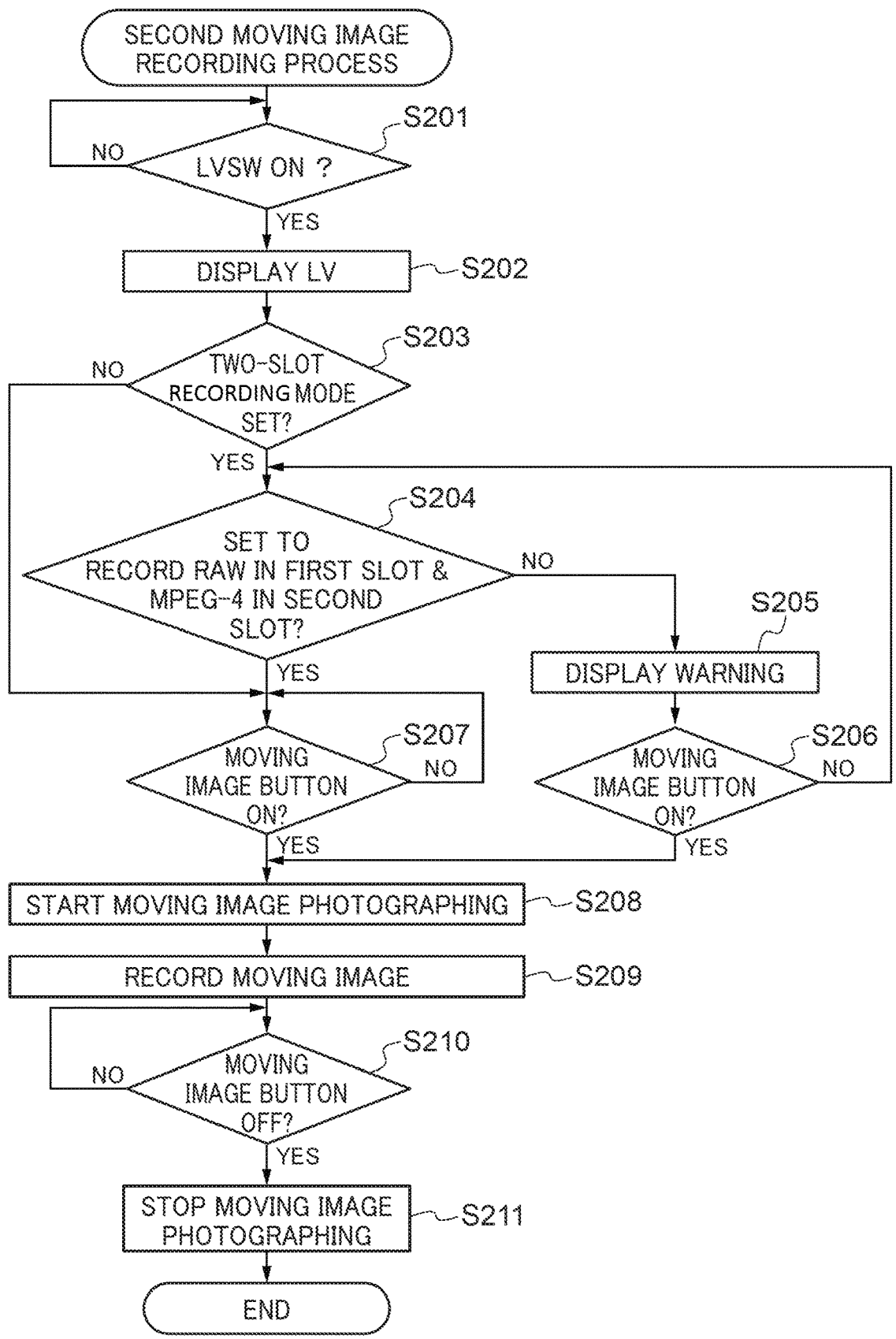
FIG. 4 is a flowchart of a second moving image recording process performed by the digital camera.

FIG. 4 is a flowchart of a second moving image recording process performed by the digital camera 100. The second moving image recording process is executed by the CPU, not shown, incorporated in the system control circuit 50 (in the description of the second moving image recording process, given hereafter, this CPU is simply referred to as the "system control circuit 50") according to a second moving image recording process program stored in the ROM, not shown, either. The second moving image recording process includes a moving image recording process for simultaneously recording a moving image in a plurality of recording media, which involves coping with a case where the set recording mode is different from a predetermined one.

Referring to FIG. 4, when the second moving image recording process is executed, the system control circuit 50 determines whether or not the live view switch 84 has been turned on to start live view (step S201). If it is determined in the step S201 that the live view switch 84 has not been turned on (NO to the step S201), the system control circuit 50 waits until the live view switch 84 is turned on and repeats the determination operation.

If it is determined in the step S201 that the live view switch 84 has been turned on to start live view (YES to the step S201), the system control circuit 50 proceeds to a step S202. More specifically, the system control circuit 50 controls the image capturing device 14 to start image capturing and controls the image processing circuit 60 to perform image processing for live view on the captured image data to thereby display the live view on the display section 54 (step S202).

After displaying the live view (LV) on the display section 54 (step S202), the system control circuit 50 determines whether or not the moving image recording mode is set to the two-slot recording mode (step S203).

If it is determined in the step S203 that the moving image recording mode is set to the two-slot recording mode (YES to the step S203), the system control circuit 50 proceeds to a step S204. More specifically, the system control circuit 50 determines whether or not the recording destinations of the moving image data are set as predetermined such that image data having a large volume is recorded in the recording medium 200 mounted in the first card slot 20 and image data having a small volume is recorded in the recording medium 300 mounted in the second card slot 30 (step S204). That is, for example, in a case where the moving image recording formats of the moving image recording settings in the two-slot recording mode are the two types of RAW and MPEG-4, the system control circuit 50 determines whether or not the recording destinations of the moving image data are set as predetermined, more specifically, such that RAW data having a large volume is recorded in the recording medium 200 and MPEG-4 data having a small volume is recorded in the recording medium 300.

If it is determined in the step S204 that the recording destinations of the moving image data are set as predetermined (YES to the step S204), the system control circuit 50 determines whether or not the moving image button 82 has been turned on (step S207). If it is determined in the step S207 that the moving image button 82 has not been turned on (NO to the step S207), the system control circuit 50 waits until the moving image button 82 is turned on and repeats the determination operation. On the other hand, if it is determined in the step S207 that the moving image button 82 has been turned on (YES to the step S207), the system control circuit 50 proceeds to a step S208.

More specifically, the system control circuit 50 starts moving image photographing and controls the image processing circuit 60 to perform image processing according to the moving image recording settings set in advance to thereby generate image data (step S208). Then, the system control circuit 50 records the generated image data according to a combination of each card slot and the moving image recording settings therefor, set in advance (step S209). More specifically, in a case where it is determined in the step S203 that the moving image recording mode is set to the two-slot recording mode, the system control circuit 50 generates and records two image data. Note that in a case where it is determined in the step S203 that the moving image recording mode is set to the one-slot recording mode, the system control circuit 50 generates and records only one image data, as will be described hereinafter.

After recording the moving image (step S209), the system control circuit 50 determines whether or not the moving image button 82 has been turned off (step S210). If it is determined in the step S210 that the moving image button 82 has not been turned off (NO to the step S210), the system control circuit 50 waits until the moving image button 82 is turned off and repeats the determination operation. If it is determined in the step S210 that the moving image button 82 has been turned off (YES to the step S210), the system control circuit 50 stops the moving image photographing (step S211), followed by terminating this second moving image recording process.

On the other hand, if it is determined in the step S204 that the recording destinations of the moving image data are not set as predetermined (NO to the step S204), the system control circuit 50 displays a warning on the display section 54 to the effect that the current settings may reduce the time period over which a moving image can be photographed (step S205). Then, after displaying the warning (step S205), the system control circuit 50 determines whether or not the moving image button 82 has been turned on by the user (step S206). If it is determined in the step S206 that the moving image button 82 has not been turned on (NO to the step S206), the system control circuit 50 returns to the step S204. On the other hand, if it is determined in the step S206 that the moving image button 82 has been turned on (YES to the step S206), the system control circuit 50 proceeds to the step S208 and executes the step S208 et seq. This is because the importance is placed on immediacy with which user's intention is realized.

On the other hand, if it is determined in the step S203 that the moving image recording mode is not set to the two-slot recording mode but to the one-slot recording mode (NO to the step S203), the system control circuit 50 proceeds to the step S207. In this case, the system control circuit 50 generates and records one image data.

According to the process in FIG. 4, it is determined whether or not the recording destinations are set such that image data having a large volume is recorded in the recording medium 200 close to the internal casing 130 which is advantageous in heat diffusion, and image data having a small volume is recorded in the recording medium 300 far from the internal casing 130 (step S204). That is, in a case where two types of the moving image recording formats are set, the system control circuit 50 determines whether or not the recording destinations are set as predetermined such that image data having a large volume is recorded in the recording medium 200 which is advantageous in heat diffusion, and image data having a small volume is recorded in the other recording medium 300. Then, if the recording destinations of the moving image data are not set as predetermined (NO to the step S204), the warning is displayed to the user (step S205).

With this, it is possible to avoid settings having a possibility that the time period over which a moving image can be photographed is reduced and prompt the user to change the settings to settings which can extend the time period over which a moving image can be photographed by uniformly diffusing heat generated from the recording medium 200 throughout the entire digital camera 100. Further, it is possible to prevent a combination of the volume of moving image data and a recording medium to record the moving image data from causing a local temperature rise of the grip portion cover 115, for example.

Next, a third moving image recording process will be described.

Figure 5:
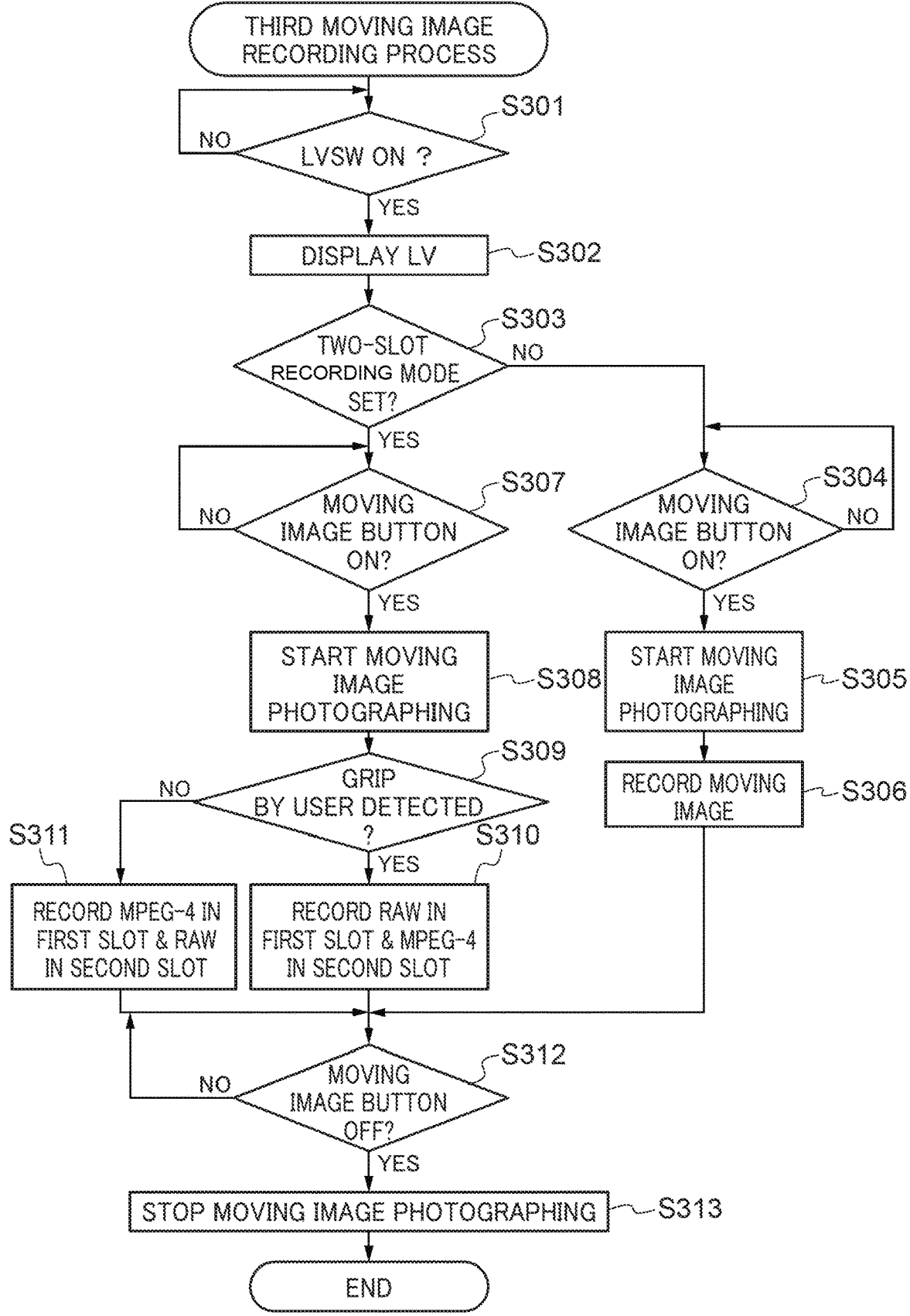
FIG. 5 is a flowchart of a third moving image recording process performed by the digital camera.

FIG. 5 is a flowchart of the third moving image recording process performed by the digital camera 100. The third moving image recording process is executed by the CPU, not shown, incorporated in the system control circuit 50 (in the description of the third moving image recording process, given hereafter, this CPU is simply referred to as the "system control circuit 50") according to a third moving image recording process program stored in the ROM, not shown, either. This moving image recording process includes a moving image recording process for simultaneously recording a moving image in a plurality of recording media, which involves detecting whether or not a user is gripping the grip portion and changing a combination of moving image data to be recorded and a recording medium based on a result of the detection.

Referring to FIG. 5, when the moving image recording process is executed, the system control circuit 50 determines whether or not the live view switch 84 has been turned on to start live view (step S301). If it is determined in the step S301 that the live view switch 84 has not been turned on (NO to the step S301), the system control circuit 50 waits until the live view switch 84 is turned on and repeats the determination operation.

If it is determined in the step S301 that the live view switch 84 has been turned on to start live view (YES to the step S301), the system control circuit 50 proceeds to a step S302. More specifically, the system control circuit 50 controls the image capturing device 14 to start image capturing and controls the image processing circuit 60 to perform image processing for live view on the captured image data to thereby display the live view (LV) on the display section 54 (step S302).

After displaying the live view on the display section 54 (step S302), the system control circuit 50 determines whether or not the moving image recording mode is set to the two-slot recording mode (step S303).

If it is determined in the step S303 that the moving image recording mode is set to the two-slot recording mode (YES to the step S303), the system control circuit 50 determines whether or not the moving image button 82 has been turned on (step S307). If it is determined in the step S307 that the moving image button 82 has not been turned on (NO to the step S307), the system control circuit 50 waits until the moving image button 82 is turned on and repeats the determination operation.

On the other hand, if it is determined in the step S307 that the moving image button 82 has been turned on (YES to the step S307), the system control circuit 50 proceeds to a step S308. More specifically, the system control circuit 50 starts moving image photographing and controls the image processing circuit 60 to perform image processing according to the settings of two moving image recording set in advance to thereby generate two image data (step S308). After generating the image data (step S308), the system control circuit 50 monitors the grip detection section 88 and determines whether or not the user is gripping the grip portion 110 (step S309).

If it is determined in the step S309 that the user is gripping the grip portion 110 (YES to the step S309), the system control circuit 50 proceeds to a step S310. More specifically, the system control circuit 50 records image data having a large volume in the recording medium 200 mounted in the first card slot 20 close to the internal casing 130. Further, the system control circuit 50 records image data having a small volume in the recording medium 300 mounted in the second card slot 30 far from the internal casing 130 (step S310). For example, in a case where the moving image recording formats of the moving image recording settings in the two-slot recording mode are the two types of RAW and MPEG-4, the system control circuit 50 records RAW data having a large volume in the recording medium 200 and MPEG-4 data having a small volume in the recording medium 300. This makes it possible to disperse heat generated in the recording medium 200 throughout the entire digital camera 100 via the internal casing 130 and reduce the influence of the generated heat.

After recording the image data (step S310), the system control circuit 50 proceeds to a step S312. More specifically, the system control circuit 50 determines whether or not the moving image button 82 has been turned off (step S312). If it is determined in the step S312 that the moving image button 82 has not been turned off (NO to the step S312), the system control circuit 50 waits until the moving image button 82 is turned off and repeats the determination operation. If it is determined in the step S312 that the moving image button 82 has been turned off (YES to the step S312), the system control circuit 50 stops the moving image photographing (step S313), followed by terminating this third moving image recording process.

On the other hand, if it is determined in the step S309 that the grip portion 110 is not being gripped by the user (NO to the step S309), the system control circuit 50 proceeds to a step S311. More specifically, the system control circuit 50 records image data having a small volume in the recording medium 200 mounted in the first card slot 20 close to the internal casing 130. Further, the system control circuit 50 records image data having a large volume in the recording medium 300 mounted in the second card slot 30 far from the internal casing 130 (step S311).

With this, in a case where the user is not gripping the grip portion 110, it is possible to record image data having a large volume in the recording medium 300 mounted in the second card slot 30 close to the grip portion cover 115 and diffuse generated heat to the outside via the grip portion 110. In this case, since the user is not gripping the grip portion 110, the user is not made feel uncomfortable.

After recording the image data (step S311), the system control circuit 50 proceeds to the step S312 to execute the same process as described hereinabove.

On the other hand, if it is determined in the step S303 that the moving image recording mode is not set to the two-slot recording mode but to the one-slot recording mode (NO to the step S303), the system control circuit 50 determines whether or not the moving image button 82 has been turned on (step S304). If it is determined in the step S304 that the moving image button 82 has not been turned on (NO to the step S304), the system control circuit 50 waits until the moving image button 82 is turned on and repeats the determination operation.

On the other hand, if it is determined in the step S304 that the moving image button 82 has been turned on (YES to the step S304), the system control circuit 50 proceeds to a step S305. More specifically, the system control circuit 50 starts moving image photographing and controls the image processing circuit 60 to perform image processing according to the moving image recording settings set in advance to thereby generate one image data (step S305), and records the moving image data subjected to the image processing in one of the recording media 200 and 300 (step S306). At this time, in a case where it has been detected by the mounting detection section 26 or 36 that a recording medium has been mounted in only one of the card slots 20 and 30, the system control circuit 50 records the moving image data in the card slot in which the recording medium has been mounted. After recording the moving image data (step S306), the system control circuit 50 proceeds to the step S312 to execute the same process as described hereinabove.

According to the process in FIG. 5, in a case where a user (photographer) is not gripping the grip portion 110 (NO to the step S309), the moving image data having a large volume is recorded in the recording medium 300 close to the grip portion cover 115 (step S311). With this, heat generated in the recording medium for recording a large volume of image data is transferred to the exterior via the grip portion cover 115 and hence heat dissipation to the outside of the digital camera 100 is promoted by contact of the exterior with the outside air, whereby it is possible to extend the time period over which a moving image can be photographed.

Next, a second embodiment will be described.

Figure 6A:
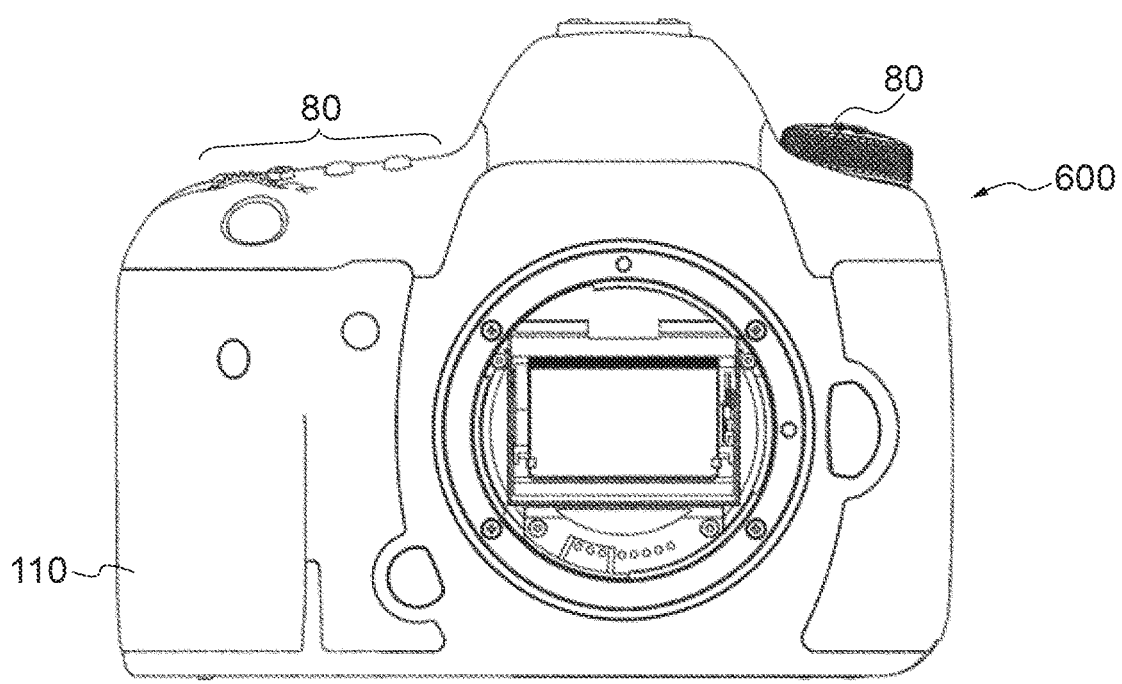
FIGS. 6A and 6B are views showing an image capturing apparatus (digital camera) according to a second embodiment.
Figure 6B:
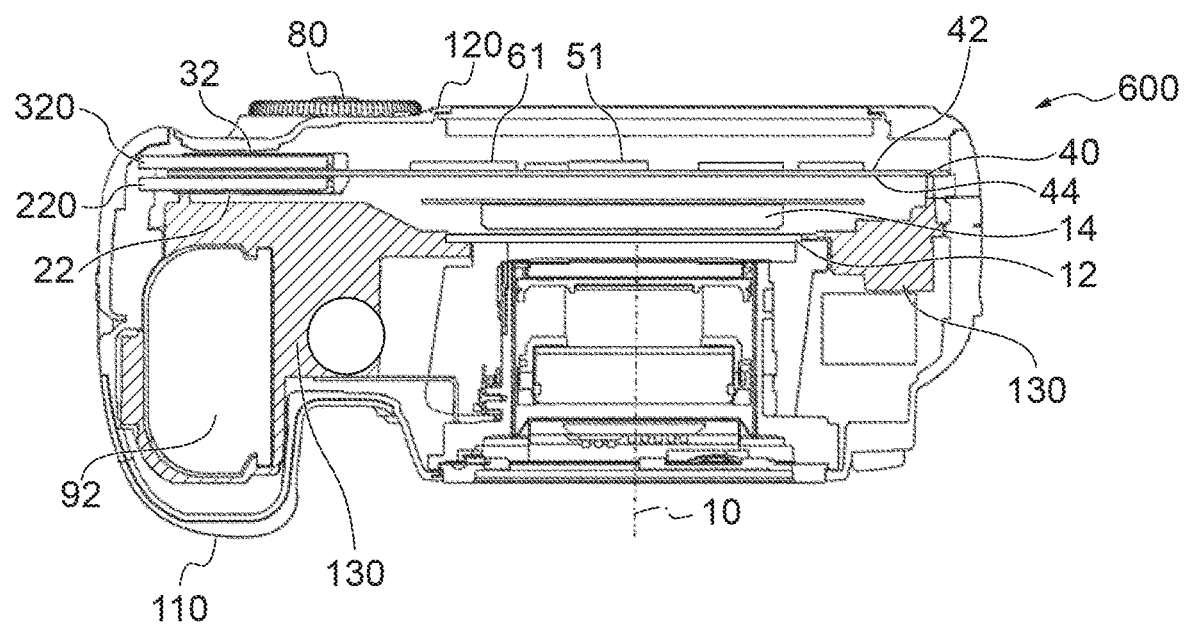

FIGS. 6A and 6B are views showing a digital camera 600 as an image capturing apparatus according to the second embodiment. FIG. 6A is a front view of the digital camera 600 and FIG. 6B is a central cross-sectional view of the digital camera 100, taken along a horizontal direction In this digital camera, recording media 220 and 320 are mounted along a direction orthogonal to the photographing optical axis 10 of the digital camera 100, and an image processing engine 61 is mounted on a surface, opposed to the rear cover 120, of the main circuit board 40.

The following description will be given mainly of different points of the digital camera 600 as the image capturing apparatus according to the second embodiment from the digital camera 100 as the image capturing apparatus according to the first embodiment.

Referring to FIGS. 6A and 6B, the digital camera 100 includes the main circuit board 40, the rear cover 120 as the exterior component, and the internal casing 130.

The main circuit board 40 is arranged orthogonally to the photographing optical axis 10 and in parallel with the rear cover 120. The first surface 42 of the main circuit board 40 is opposed to the rear cover 120 and a second card slot 32 in which the second recording medium 320 is mounted is provided on the first surface 42. Further, a first card slot 22 in which the first recording medium 220 is mounted is provided on a second surface 44, opposite to the first surface 42, of the main circuit board 40. The recording medium 220 and the recording medium 320 are the recording media of the same type.

The main circuit board 40 is in contact with and held on the internal casing 130 via the second surface 44. The first card slot 22 is closer to the internal casing 130 than the second card slot 32 is, and the second card slot 32 is closer to the rear cover 120 than the first card slot 22 is. Therefore, heat generated in the recording medium 320 mounted in the second card slot 32 is easily transferred to the rear cover 120, and heat generated in the recording medium 220 mounted in the first card slot 22 is easily transferred to the internal casing 130.

The internal casing 130 is partially or entirely formed of metal, and heat transferred to the internal casing 130 is substantially uniformly diffused throughout the entire digital camera 100. Therefore, by transferring heat generated in the digital camera 100 to the internal casing 130, it is possible to substantially uniformly diffuse the heat throughout the entire digital camera 100, and thereby prevent reduction of the time period over which a moving image can be photographed, which would be otherwise caused by a local temperature rise.

Next, the first moving image recording process performed by the digital camera 600 shown in FIGS. 6A and 6B will be described with reference to the above-described flowchart in FIG. 3. This moving image recording process is executed by the CPU, not shown, incorporated in the system control circuit 50 (in the description of the first moving image recording process, given hereafter, this CPU is simply referred to as the "system control circuit 50") according to the moving image recording process program stored in the ROM, not shown, either. This moving image recording process includes a moving image recording process performed in a case where a moving image is simultaneously recorded in a plurality of recording media.

The steps S101 to S108 in FIG. 3 are the same as those in the first embodiment, and hence description thereof is omitted. In the step S108, the system control circuit 50 starts moving image photographing and controls the image processing circuit 60 to perform image processing according to the settings of two moving image recording set in advance to thereby generate two image data. The system control circuit 50 records the image data in the recording media, respectively (step S109).

At this time, the system control circuit 50 records image data having a large volume in the recording medium 220 mounted in the first card slot 22 far from the rear cover 120. Further, the system control circuit 50 records image data having a small volume in the recording medium 320 mounted in the second card slot 32 close to the rear cover 120 (step S109). This makes it possible to efficiently disperse a large amount of heat generated in the recording medium 220 which records the image data having a large volume, within the digital camera 100 via the internal casing 130, whereby it is possible to prevent a local temperature rise and thereby extend the time period over which a moving image can be photographed. The processing operations in the step S110 et seq. are the same as those in the first embodiment.

According to the present embodiment, moving image data having a large volume is recorded in the recording medium 220 close to the internal casing 130 which is advantageous in heat diffusion in the digital camera 100, and moving image data having a small volume is recorded in the recording medium 320 close to the rear cover 120. With this, a large amount of heat generated in the recording medium 220 is easily and substantially uniformly diffused throughout the entire digital camera 100, and hence it is possible to prevent a local temperature rise of the rear cover 120 and thereby extend the time period over which a moving image can be photographed.

That is, to extend the time period over which a moving image can be photographed, it is effective to reduce the amount of heat transferred from the recording media (220 and 320) to the rear cover 120 to a minimum, and increase the amount of heat transferred to the internal casing 130 to substantially uniformly diffuse the heat within the digital camera 100. Therefore, in the present embodiment, image data having a small volume and causing generation of a small amount of heat is recorded in the recording medium 320 close to the rear cover 120, and image data having a large volume and causing generation of a large amount of heat is recorded in the recording medium 220 close to the internal casing 130.

In the present embodiment, a system control component 51 and the image processing engine 61 are mounted on the first surface 42 of the main circuit board 40. Further, the system control circuit 50 is formed in the system control component 51, and the image processing circuit 60 is formed in the image processing engine 61. The system control component 51 and the image processing engine 61 are heat generating components which are high in power consumption, and since the both are mounted on the first surface 42 of the main circuit board 40, the generated heat is easily transferred to the rear cover 120.

To extend the time period over which a moving image can be photographed, it is necessary to reduce the amount of heat transferred from the recording media (220 and 320) to the rear cover 120 to a minimum, and hence it is necessary to reduce the power consumption of the electronic components mounted on the first surface 42 of the main circuit board 40. Therefore, image data which causes low power consumption (image data having a small volume) is recorded in the recording medium 320 mounted in the second card slot 32 provided on the first surface 42 of the main circuit board 40. On the other hand, image data which causes high power consumption (image data having a large volume) is recorded in the recording medium 220 mounted in the first card slot 22 provided on the second surface 44 of the main circuit board 40 to diffuse a large amount of generated heat throughout the entire digital camera 100.

In the present embodiment, image data which causes low power consumption is recorded in the recording medium 320 mounted in the second card slot 32 provided on the first surface 42 of the main circuit board 40, as predetermined. Further, image data which causes high power consumption is recorded in the recording medium 220 mounted in the first card slot 22 provided on the second surface 44 of the main circuit board 40. Further, in a case where a combination of image data and a recording medium is not set as predetermined, it is preferable to give a warning to a user.

Next, a third embodiment will be described.

Figure 7:
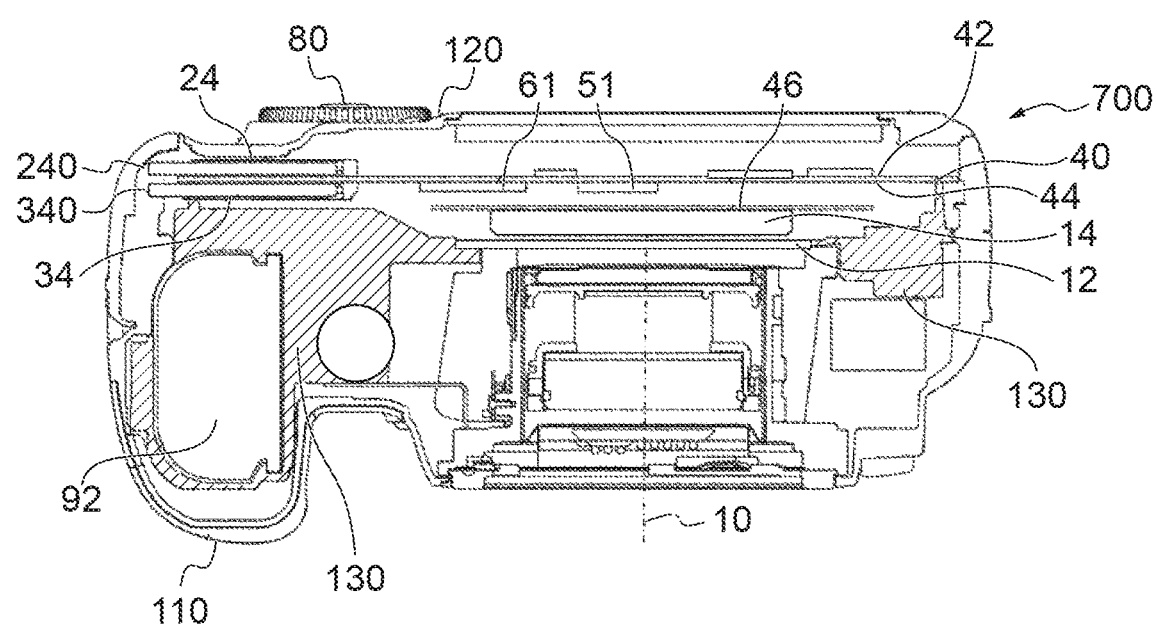
FIG. 7 is a central cross-sectional view of an image capturing apparatus (digital camera) according to a third embodiment, taken along a horizontal direction.

FIG. 7 is a central cross-sectional view of a digital camera 700 as an image capturing apparatus according to the third embodiment, taken along a horizontal direction. In the digital camera 700, recording media 240 and 340 are arranged along a direction orthogonal to the photographing optical axis 10, and the image processing engine 61 is mounted on the second surface 44, opposite to the first surface 42 opposed to the rear cover 120, of the main circuit board 40.

The following description will be given mainly of different points of the digital camera 700 as the image capturing apparatus according to the third embodiment from the digital camera 100 shown in FIGS. 1A and 1B and the digital camera 600 shown in FIGS. 6A and 6B.

Referring to FIG. 7, the digital camera 700 includes the main circuit board 40. The main circuit board 40 is arranged orthogonally to the photographing optical axis 10 and in parallel with the rear cover 120. The main circuit board 40 has the first surface 42 opposed to the rear cover 120 and the second surface 44 opposite to the first surface 42. A first card slot 24 in which the first recording medium 240 is mounted is provided on the first surface 42, and a second card slot 34 in which the second recording medium 340 is mounted is provided on the second surface 44. Further, the system control component 51 and the image processing engine 61 are mounted on the second surface 44. The recording medium 240 and the recording medium 340 are of the same type.

An image capturing circuit board 46 is arranged opposed to the second surface 44 of the main circuit board 40, and the image capturing device 14 is mounted on an opposite surface of the image capturing circuit board 46 to a surface opposed to the main circuit board 40.

The system control component 51 and the image processing engine 61 are heat generating components which cause high power consumption, and the both are mounted on the second surface 44 of the main circuit board 40. Therefore, heat generated in the system control component 51 and the image processing engine 61 is easily be transferred to the image capturing device 14 via the image capturing circuit board 46. If the temperature of the image capturing device 14 rises, the quality of a photographed moving image is degraded, and hence the time period over which a moving image can be photographed is also limited due to the temperature of the image capturing device 14. That is, in the digital camera 100 shown in FIG. 7, to extend the time period over which a moving image can be photographed, it is preferable to prevent a temperature rise of the image capturing device 14.

Next, the first moving image recording process performed by the digital camera 700 shown in FIG. 7 will be described with reference to the above-described flowchart in FIG. 3. This moving image recording process is executed by the CPU, not shown, incorporated in the system control circuit 50 (in the description of the first moving image recording process, given hereafter, this CPU is simply referred to as the "system control circuit 50") of the digital camera 700 according to the moving image recording process program stored in the ROM, not shown, either. This moving image recording process includes a moving image recording process performed in a case where a moving image is simultaneously recorded in a plurality of recording media.

The steps S101 to S108 in FIG. 3 are the same as those in the first and second embodiments, and hence description thereof is omitted. In the step S108, the system control circuit 50 starts moving image photographing and controls the image processing circuit 60 to perform image processing according to the settings of two moving image recording set in advance to thereby generate two image data. The system control circuit 50d records the generated image data in the recording media (step S109).

In this case, the system control circuit 50 records image data having a large volume in the recording medium 240 mounted in the first card slot 24 provided on the first surface 42 of the main circuit board 40, which is far from the image capturing device 14. Further, the system control circuit 50 records image data having a small volume in the recording medium 340 mounted in the second card slot 34 provided on the second surface 44 of the main circuit board 40, which is close to the image capturing device 14 (step S109). This makes it possible to transfer a large amount of heat generated in the recording medium 240 to the first surface 42 of the main circuit board 40, which is far from the image capturing device 14 and thereby reduce the influence of heat on the image capturing device 14. Therefore, it is possible to suppress reduction of the time period over which a moving image can be photographed to thereby extend the time period. The processing operations in the step S110 et seq. are the same as those in the first and second embodiments.

According to the present embodiment, image data having a large volume is recorded in the recording medium 240 far from the image capturing device 14 and image data having a small volume is recorded in the recording medium 340 close to the image capturing device 14. With this, the power consumption of the electronic components mounted on the second surface 44 of the main circuit board 40 is relatively reduced, which means that the recording settings are set such that the influence of heat on the image capturing device 14 is reduced to extend the time period over which a moving image can be photographed.

That is, to extend the time period over which a moving image can be photographed, it is necessary to reduce the amount of heat transferred to the image capturing circuit board 46 by reducing the power consumption of the electronic components mounted on the second surface 44 of the main circuit board 40, which is opposed to the image capturing circuit board 46. Therefore, in the present embodiment, image data which causes low power consumption (image data having a small volume) is recorded in the recording medium 340 mounted in the second card slot 34 provided on the second surface 44 of the main circuit board 40, on which the image processing engine 61 is mounted. Further, image data which causes high power consumption (image data having a large volume) is recorded in the recording medium 240 mounted in the first card slot 24 provided on the first surface 42 of the main circuit board 40.

In the present embodiment, as described above, image data which causes low power consumption is recorded in the recording medium 340 mounted in the second card slot 34, and image data which causes high power consumption is recorded in the recording medium 240 mounted in the first card slot 24, as predetermined. Further, in a case where a combination of image data and a recording medium is not set as predetermined, it is preferable to give a warning to a user.

The present invention has been described heretofore based on the embodiments thereof. However, the present invention is not limited to these embodiments, but it is to be understood that it can be practiced in various forms, without departing from the spirit and scope thereof. Particularly, although in the above-described embodiments, the two card slots are provided and the two moving image recording modes, i.e. the one-slot recording mode and the two-slot recording mode, are set, this is not limitative, but more than two card slots can be provided and more than two moving image recording modes can be set. Further, although different volumes of data of a moving image to be recorded are described based on different moving image recording formats, by way of example, this is not limitative.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-196444 filed Oct. 29, 2019, which is hereby incorporated by reference herein in its entirety.

What is claimed is:

1. An image capturing apparatus comprising:
   an image capturing unit;
   an image processing unit configured to perform predetermined processing on a moving image captured by the image capturing unit;
   a grip portion for gripping an image capturing apparatus body;
   a plurality of recording media arranged inside the grip portion;
   a chassis provided inside the image capturing apparatus for ensuring strength of the image capturing apparatus; and
   a control unit configured to control the image capturing apparatus,
   wherein when causing moving image data, which are formed in a plurality of recording modes by the image processing unit using the moving image, to be recorded in the plurality of recording media, the control unit causes image data having a large volume to be recorded in a recording medium close to the chassis and causes image data having a small volume to be recorded in a recording medium far from the chassis.

2. The image capturing apparatus according to claim 1, wherein the chassis is partially or entirely formed of metal and is a member for ensuring strength of the image capturing apparatus body.

3. The image capturing apparatus according to claim 1, wherein the moving image data formed in the plurality of recording modes are a plurality of moving image data formed in a plurality of formats selected by a user, using the same moving image data.

4. The image capturing apparatus according to claim 1, further comprising a setting unit configured to set a recording mode for recording the moving image data in the recording medium, and
   wherein in a case where the recording mode is not set by the setting unit such that moving image data having a large volume is recorded in the recording medium close to the chassis and moving image data having a small volume is recorded in the recording medium far from the chassis, the control unit gives a warning to a user.

5. The image capturing apparatus according to claim 1, wherein the plurality of recording media are arranged in parallel with an optical axis of the image capturing apparatus.

6. The image capturing apparatus according to claim 5, further comprising a detection unit configured to detect that the grip portion is being gripped by a user, and
   wherein in a case where it is not detected by the detection unit that the grip portion is being gripped by the user, the control unit causes the image data having a large volume to be recorded in the recording medium far from the chassis to thereby cause heat to be diffused to the outside of the image capturing apparatus via the grip portion.

7. The image capturing apparatus according to claim 1, wherein the plurality of recording media are arranged orthogonal to an optical axis of the image capturing apparatus.

8. The image capturing apparatus according to claim 7, further comprising a rear cover that protects a rear side of the image capturing apparatus, and
   wherein the recording medium far from the chassis is mounted on a surface, which is opposed to the rear cover, of a circuit board arranged opposed to the rear cover.

9. The image capturing apparatus according to claim 8, wherein an image processing engine is mounted on the surface, which is opposed to the rear cover, of the circuit board.

10. The image capturing apparatus according to claim 8, wherein an image processing engine is mounted on a surface, which is opposite to the surface opposed to the rear cover, of the circuit board, and an image capturing device is disposed in an opposed relationship to the image processing engine.

11. The image capturing apparatus according to claim 10, wherein the control unit causes the image data having a small volume to be recorded in the recording medium close to the image capturing device.

12. A method of controlling an image capturing apparatus including:
   an image capturing unit,
   an image processing unit configured to perform predetermined processing on a moving image captured by the image capturing unit,
   a grip portion for gripping an image capturing apparatus body,
   a plurality of recording media arranged inside the grip portion, and
   a chassis provided inside the image capturing apparatus for ensuring strength of the image capturing apparatus,
   the method comprising causing, when causing moving image data, which are formed in a plurality of recording modes by the image processing unit using the moving image, to be recorded in the plurality of recording media, image data having a large volume to be recorded in a recording medium close to the chassis and image data having a small volume to be recorded in a recording medium far from the chassis.

* * * * *